(12) United States Patent
Scherpa et al.

(10) Patent No.: US 9,304,649 B2
(45) Date of Patent: Apr. 5, 2016

(54) SELECTABLE FLATTENING HIERARCHICAL FILE BROWSER

(71) Applicant: International Business Machines Corporation, Armonk, NY (US)

(72) Inventors: Josef Scherpa, Fort Collins, CO (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 14/184,933

(22) Filed: Feb. 20, 2014

(65) Prior Publication Data

US 2014/0173523 A1 Jun. 19, 2014

Related U.S. Application Data

(62) Division of application No. 11/470,054, filed on Sep. 5, 2006, now Pat. No. 8,683,352.

(51) Int. Cl.
*G06F 3/0481* (2013.01)
*G06F 17/30* (2006.01)

(52) U.S. Cl.
CPC ........ *G06F 3/0481* (2013.01); *G06F 17/30126* (2013.01); *G06F 17/30994* (2013.01)

(58) Field of Classification Search
CPC .................................................... G06F 3/0481
USPC .......................................................... 715/853
See application file for complete search history.

(56) References Cited

U.S. PATENT DOCUMENTS

| | | | | | |
|---|---|---|---|---|---|
| 5,388,196 | A | * | 2/1995 | Pajak | G06Q 10/10 707/E17.008 |
| 5,574,898 | A | * | 11/1996 | Leblang | G06F 11/3476 |
| 5,644,736 | A | * | 7/1997 | Healy | G06F 3/04842 715/784 |
| 5,649,200 | A | * | 7/1997 | Leblang | G06F 8/71 707/999.202 |
| 6,029,172 | A | * | 2/2000 | Jorna | G06F 17/30994 |
| 6,670,973 | B1 | * | 12/2003 | Hill | G06Q 10/063 705/7.11 |
| 6,765,597 | B2 | * | 7/2004 | Barksdale | G06F 17/30126 707/E17.012 |
| 6,772,148 | B2 | * | 8/2004 | Baclawski | G06F 17/3066 |
| 6,829,615 | B2 | * | 12/2004 | Schirmer | G06F 17/30958 |
| 6,829,616 | B2 | * | 12/2004 | Chen | G06F 17/3051 |

(Continued)

*Primary Examiner* — Reza Nabi
(74) *Attorney, Agent, or Firm* — Steven M. Greenberg, Esq.; CRGO Law

(57) ABSTRACT

Embodiments of the present invention address deficiencies of the art in respect to hierarchical tree file browsers and provide a method, system and computer program product for selectably flattening a hierarchical tree object structure in a hierarchical tree object browser. In one embodiment of the invention, a method of flattening an object hierarchy in an object browser can be provided. The method can include selecting a node in an object hierarchy in an object browser and, responsive to selecting the node, displaying content for the selected node and content for at least one node below the selected node in the object browser.

6 Claims, 2 Drawing Sheets

(56) References Cited

U.S. PATENT DOCUMENTS

| | | | | |
|---|---|---|---|---|
| 6,990,638 B2 * | 1/2006 | Barksdale | G09G 5/30 | 715/853 |
| 7,197,517 B2 * | 3/2007 | Farrington | G06F 17/30595 | 707/797 |
| 7,603,393 B1 * | 10/2009 | Cote | G06F 8/71 | |
| 7,669,147 B1 * | 2/2010 | Molander | G06F 3/0482 | 707/693 |
| 7,694,219 B2 * | 4/2010 | Xu | G06F 17/30899 | 715/234 |
| 7,788,599 B2 * | 8/2010 | Michaud | G06F 3/0482 | 715/810 |
| 7,979,808 B2 * | 7/2011 | Stiso | G06F 3/0482 | 370/408 |
| 8,359,659 B2 * | 1/2013 | Sim | G06F 21/6245 | 713/166 |
| 8,683,352 B2 * | 3/2014 | Scherpa | G06F 17/30126 | 715/753 |
| 2002/0097278 A1 * | 7/2002 | Mandler | G06F 3/0481 | 715/854 |
| 2003/0063134 A1 * | 4/2003 | Lord | G06F 17/30961 | 715/853 |
| 2003/0197743 A1 * | 10/2003 | Hill | G06Q 10/063 | 715/853 |
| 2006/0020586 A1 * | 1/2006 | Prompt | G06F 17/30893 | |
| 2006/0294599 A1 * | 12/2006 | Sim | G06F 21/6245 | 726/34 |
| 2007/0143712 A1 * | 6/2007 | Baran | G06F 9/4443 | 715/853 |
| 2009/0055762 A1 * | 2/2009 | Stiso | G06F 3/0482 | 715/764 |
| 2010/0169832 A1 * | 7/2010 | Chang | G06F 17/30873 | 715/811 |

\* cited by examiner

SELECTABLE FLATTENING HIERARCHICAL FILE BROWSER

CROSS-REFERENCE TO RELATED APPLICATIONS

This application is a Divisional of U.S. application Ser. No. 11/470,054, filed Sep. 5, 2006, now U.S. Pat. No. 8,683,352, the entirety of which is incorporated herein by reference.

BACKGROUND OF THE INVENTION

1. Field of the Invention

The present invention relates to the display of objects such as files and containers in a hierarchy and more particularly to the flattening of the display of files and containers in an object hierarchy.

2. Description of the Related Art

Electronic objects in a data processing system often are organized hierarchically in a parent-child relationship. Specifically, the earliest file systems for computing environments provided a hierarchical directory structure in which electronically stored documents could be stored in specific directories or folders. Directories and folders, collectively viewed as containers, could be nested to provide a level of organization for electronic documents akin to a tree having a root node, leaf nodes and intermediate branches and connecting nodes.

Contemporary data structure theory expands upon the notion of the hierarchical directory structure to provide the most common form of genus-species data organization not only for file storage, but for general objects in memory as well. While hierarchical trees are known to be constructed programmatically in a number of ways, the most common way is the linked list of nodes in a tree formation. Generally, the hierarchical tree can be visually rendered in a GUI by providing collapsible nodes such that the hierarchy can be viewed merely as a root node, or the hierarchy can be viewed in fully expanded form to reveal the hierarchical tree. Of course, as each node in the hierarchy can be expanded or collapsed individually, any portion of the hierarchical tree can be viewed within the GUI as most computing users have become accustomed to understand.

In the most recognizable form of the conventional hierarchical tree file browser, a dual paned approach is provided. The dual paned approach includes a navigation pane and a content pane. In the navigation pane, a visual tree representative of the file hierarchy is rendered with collapsible and expandable nodes throughout. The nodes are limited, however, to containers of the hierarchy and the nodes do not include files. By comparison, in the content pane, the content of a selected node is displayed. The content generally includes both the file content of the container represented by the selected node, and any containers immediately linked in child-relationships to the container represented by the selected node.

Other recognizable forms of the conventional hierarchical tree file browser provide for a multi-paned approach. In the multi-paned approach, the left-most, primary pane includes a tree view of the entire hierarchy. Subsequent panes adjacent to the left-most, primary pane and to the right of the left-most, primary pane provide hierarchical views of the branches represented by selected nodes in the left adjacent panes. The right-most pane ultimately provides a listing of the files in a selected node as well as any containers linked to the selected node in a child relationship.

For relatively flat hierarchical file system structures, the conventional hierarchical tree file browser functions admirably after more than two decades of use. Yet, for deep, multi-branch structures, the conventional hierarchical tree file browser falls short on functionality. Specifically, in order to readily view and appreciate different files within different containers of a file system within a conventional hierarchical tree file browser, the end user must repeatedly select different nodes along a branch while recording the content of each node separately. Recognizing relationships between different files at different levels of the hierarchy of files can be near impossible.

BRIEF SUMMARY OF THE INVENTION

Embodiments of the present invention address deficiencies of the art in respect to hierarchical tree file browsers and provide a novel and non-obvious method, system and computer program product for selectably flattening a hierarchical tree structure in a hierarchical tree browser. In one embodiment of the invention, a method of flattening an object hierarchy in a browser can be provided. The method can include selecting a node in a hierarchy such as a file hierarchy, in an object browser such as a file system browser, and, responsive to selecting the node, displaying content for the selected node and content for at least one node below the selected node in the object browser.

In one aspect of the embodiment, displaying content for the selected node and content for at least one node below the selected node in the object browser, can include displaying in a file system browser both files and containers for the selected node and files and containers for at least one node below the selected node in the file system browser. In another aspect of the embodiment, displaying content for the selected node and content for at least one node below the selected node in the object browser, can include displaying in a file system browser only files for the selected node and only files for at least one node below the selected node in the file system browser, whilst suppressing from view containers for the selected node and containers for the at least one node below the selected node.

In yet another aspect of the embodiment, displaying content for the selected node and content for at least one node below the selected node in the object browser, can include determining a selection of an option to suppress containers. If it is determined that the option has been selected, only files for the selected node and only files for at least one node below the selected node in a file system browser can be displayed, whilst containers for the selected node and containers for the at least one node below the selected node can be suppressed from view. Otherwise both files and containers for the selected node and files and containers for at least one node below the selected node in the file system browser can be displayed.

In even yet another aspect of the embodiment, displaying content for the selected node and content for at least one node below the selected node in the object browser can include determining a selection of an option to show all content below a selected node. If it is determined that the option has been selected, content for the selected node and content for at least one node below the selected node can be displayed in the object browser. Otherwise only content for the selected node can be displayed in the object browser.

In another embodiment of the invention, a selectable flattening file system browser can be provided. The selectable flattening file system browser can include a navigation view of a file system hierarchy including a hierarchical arrangement of nodes, each of the nodes representing a container in the file system hierarchy. The selectable flattening file system browser further can include a selectable option to show content in a selected node of the file system hierarchy and at least one node in the file system hierarchy residing below the selected node. Finally, the selectable flattening file system browser can include a flat view of content for a selected node in the navigation view. The flat view can include content that varies according to a selection of the selectable option ranging from only content in the selected node, to content in the selected node and at least one node below the selected node.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for selectably flattening an object hierarchy in a hierarchical object browser. In accordance with an embodiment of the present invention, a node of an object hierarchy represented within the object browser can be selected for processing. In response, all of the content of all of the nodes below the selected node can be selectably presented in a single view, including both files and containers. Alternatively, only the files and not the containers below the selected node can be selectably presented in the single view. As yet a further alternative, only the content of the selected node can be presented in the single view. As a final alternative, only the files and not the containers of the selected node can be presented in the single view.

Figure 1:
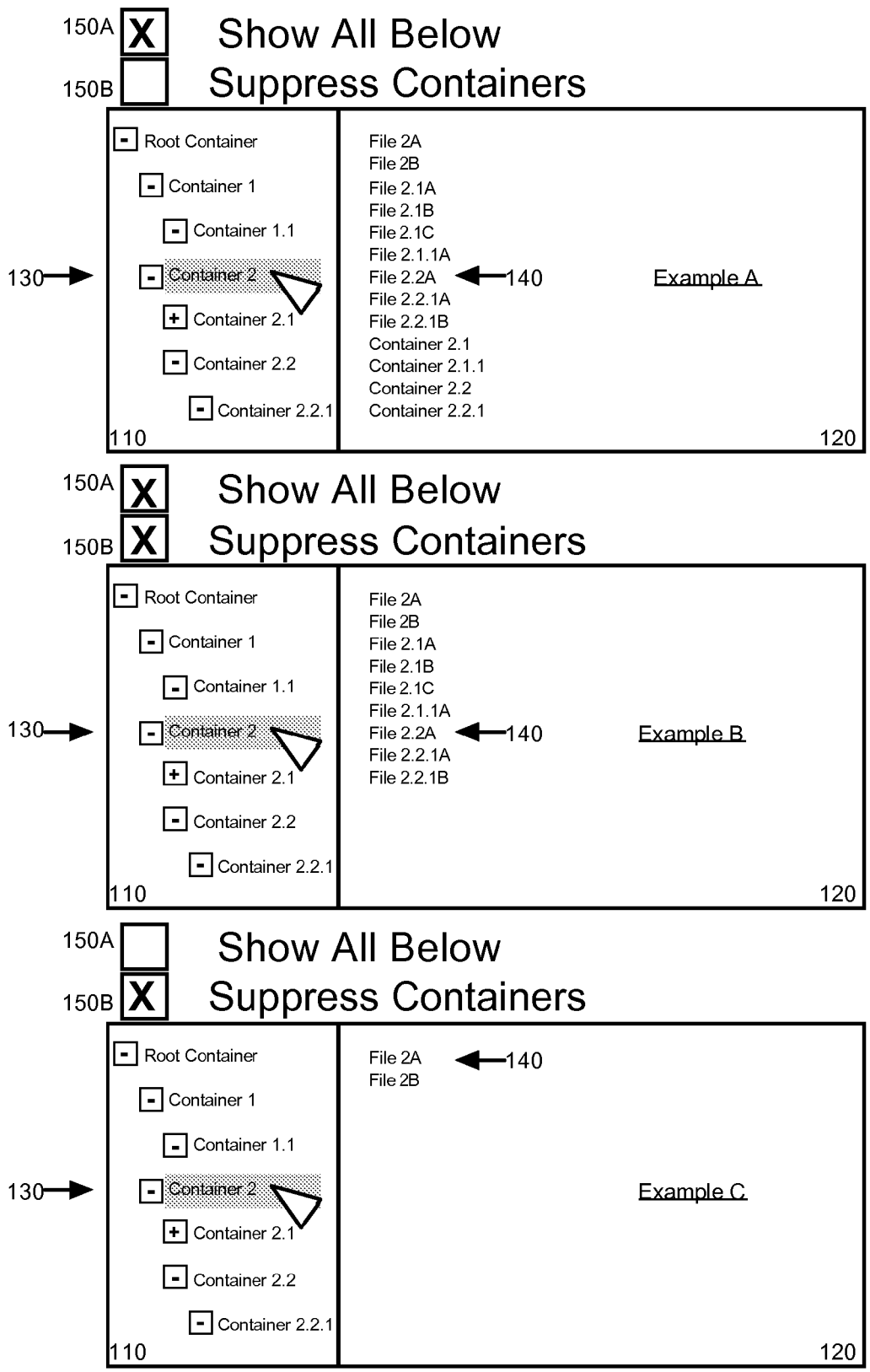
FIG. 1 is a pictorial sequence of screen shots exemplifying a method for selectably flattening an object hierarchy in a hierarchical object browser.

In further illustration, FIG. 1 is a pictorial sequence of screen shoots exemplifying a method for selectably flattening an object hierarchy in a hierarchical object browser. In the method of the invention, several flattening configurations can be established. The configurations can include displaying only the content of a selected node, displaying the content of all nodes below the selected node, displaying only the files of a selected node, and displaying only the files of all nodes below the selected node. The selection of the nodes in the hierarchy can be performed within a navigation pane of a hierarchical file browser, while the display of nodal content can be performed in a content pane of the hierarchical file browser.

Referring specifically to FIG. 1, in a first example, the option 150A to show all content below a selected node can be selected, while the option 150B to suppress the display of containers can be de-selected. A file hierarchy 130 can be rendered within a navigation pane 110 and a node in the file hierarchy 130 can be selected. In response, a flat view 140 of all content residing in nodes below the selected node can be displayed in a content pane 120 of the hierarchical file browser. In this regard, the flat view 140 can include not only the files and containers of the selected node, but also the files and containers of all child nodes below the selected node.

In the second example of FIG. 1, the option 150A to show all content below a selected node can be selected, as can the option 150B to suppress the display of containers. In this exemplary circumstance, the file hierarchy 130 can be rendered within a navigation pane 110 and a node in the file hierarchy 130 can be selected. In response, a flat view 140 of all files residing in nodes below the selected node can be displayed in the content pane 120 of the hierarchical file browser. Yet, the flat view 140 can include merely the files of the selected node and all children nodes below the selected node, and not any containers in the selected node and the children node below the selected node.

Finally, in the third example of FIG. 1, the option 150A to show all content below a selected node can be de-selected, while the option 150B to suppress the display of containers can be selected. In this exemplary circumstance, the file hierarchy 130 can be rendered within a navigation pane 110 and a node in the file hierarchy 130 can be selected. In response, the flat view 140 of only those files residing in the selected node can be displayed in the content pane 120 of the hierarchical file browser. The flat view 140, however, can exclude the containers of the selected node and all content of all nodes below the selected node. Notably, though not illustrated, it will be apparent to the skilled artisan that in a fourth possible configuration, both the containers and files of a selected node can be displayed as is the case in a conventional hierarchical file browser.

Figure 2:
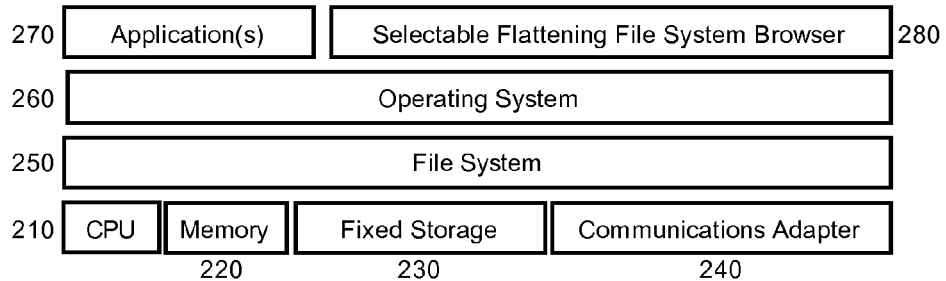
FIG. 2 is a block diagram illustrating a computing architecture configured to support a selectable flattening hierarchical object browser; and, FIG. 3 is a flow chart illustrating a process for flattening an object hierarchy in a hierarchical object browser.

In yet further illustration, FIG. 2 is a block diagram illustrating a computing architecture configured to support a selectable flattening hierarchical file browser. The computing architecture can include a host computing platform having a central processing unit (CPU) 210, associated volatile and non-volatile memory 220, fixed storage 230 and a communications adapter 240. The host computing platform can support the execution of a file system 250 managing files and containers in memory 220, fixed storage 230 and even in remote storage through communications adapter 240. An operating system 260 can execute in conjunction with the file system 250, and can even be combined with the file system as a single entity. The operating system 260 can support the operation of one or more computing applications 270 as well as the selectable flattening file system browser 280. Though the selectable flattening file system browser 280 is shown as a separate application as is the case with many file system browsers, the selectable flattening file system browser 280 just as easily can be included as part and parcel of either the operating system 260 or the file system 250.

Figure 3:
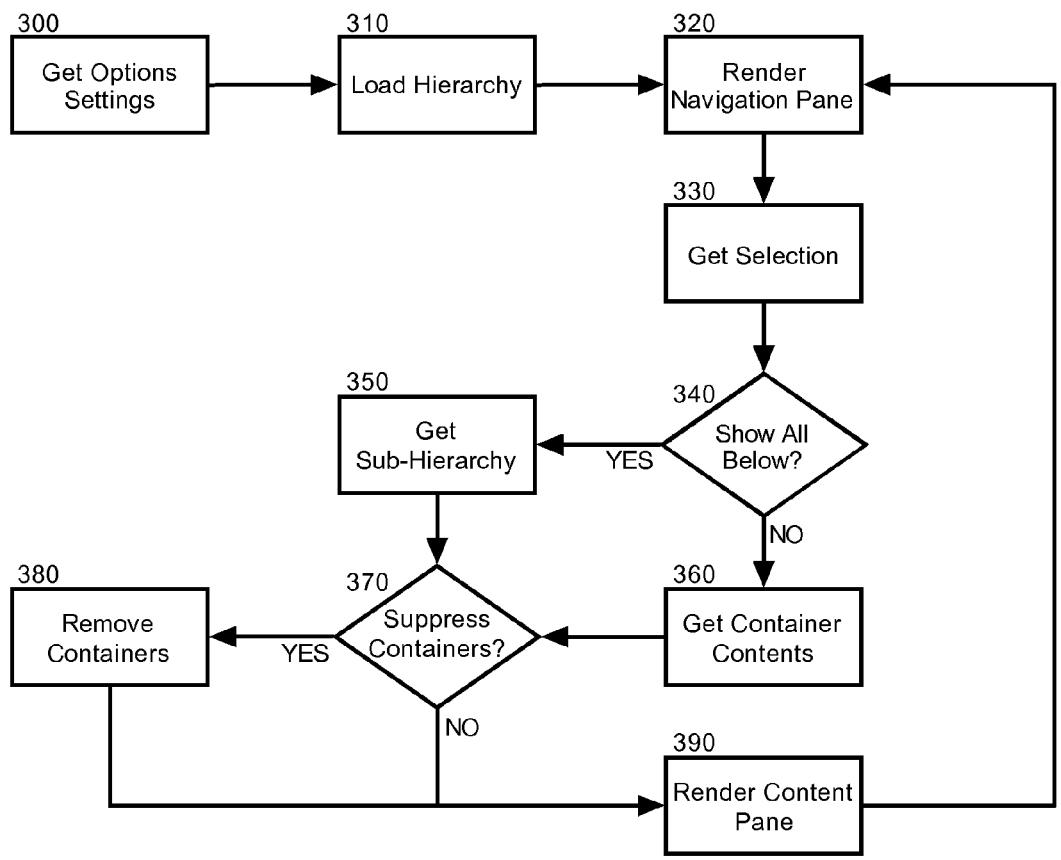

The selectable flattening file system browser 280 can perform the selectable flattening of a file system hierarchy in a file system hierarchical browser. In illustration, FIG. 3 is a flow chart illustrating a process for flattening a file hierarchy in a hierarchical file browser. Beginning in block 300, the options configurations can be retrieved from memory indicating a flattening preference for the file system browser. The flattening preferences can range from showing only those files and containers of a selected node in a file system hierarchy, to showing a flat view of all files and containers for all nodes residing below a selected node in the file system hierarchy.

In block 310, the file system hierarchy can be loaded for processing, and in block 320, a navigation pane for the file system browser can be rendered. In block 330, a node in the file system hierarchy can be selected in the navigation pane. In decision block 340, if the options configurations provide for the revelation of all content below the selected node, in block 350 the entirety of the sub-hierarchy below the selected node can be retrieved for processing. Otherwise, in block 360, only the content of the container represented by the selected node need by retrieved for processing.

In either circumstance, in decision block 370 it can be determined whether or not to suppress the display of containers in a flat view of the file hierarchy. If so, in block 380 the containers can be removed from rendering in the flat view. Otherwise, the containers can remain for rendering in the flat view. As such, in block 390 the content pane of the file system browser can be rendered with the remaining content. Thereafter, the process can return to block 320 in which the navigation pane can be rendered and a new selection of a node can be applied in block 330. The process can continue for the duration of operation of the file system browser.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A system including a processor and a selectable flattening object browser, the selectable flattening object browser comprising:
    a navigation view of an object hierarchy comprising a hierarchical arrangement of nodes in the flattening object browser, each of the nodes representing a container in the object hierarchy;
    a singular selectable option configured for toggling between (1) a display of files and containers of files of all nodes below a selected node and (2) a display of only files and containers in the selected node to show content in a selected node of the object hierarchy and at least one node in the object hierarchy residing below the selected node; and,
    a flat view of content for the selected node in the navigation view, the flat view comprising displaying files and containers of files for the selected node and also files and containers for all nodes below the selected node in the object browser if the singular option toggled to display files and containers of files of all nodes below the selected node, but otherwise displaying files and containers of files for only the selected node if the singular option is toggled to display only files and containers in the selected node, responsive to selecting a node in the object hierarchy content that varies according to a selection of the selectable option ranging from only content in the selected node, to content in the selected node and at least one node below the selected node.

2. The selectable flattening object browser of claim 1, wherein the navigation view is disposed in a navigation pane and the flat view is disposed in a content pane.

3. The selectable flattening object browser of claim 1, wherein the object hierarchy is a file system hierarchy and wherein the flattening object browser is a flattening file system browser.

4. A computer program product comprising a non-transitory computer usable storage medium having computer usable program code for flattening an object hierarchy in an object browser, the computer program product including:
    computer usable program code for displaying an object browser in a memory of a computer;
    computer usable program code for providing a singular option configured for toggling between (1) a display of files and containers of files of all nodes below a selected node and (2) a display of only files and containers in the selected node;
    computer usable program code for selecting a node in an object hierarchy displayed in the object browser; and,
    computer usable program code for, responsive to selecting the node, displaying files and containers content for the selected node and also all files and containers for all nodes below the selected node in the object browser if the singular option is toggled to display files and containers of files of all nodes below the selected node, but otherwise displaying files and containers of files for only the selected node if the singular option is toggled to display only files and containers in the selected node in response to a selection of the node.

5. The computer program product of claim 4, further comprising:
    additionally providing an option to toggle a suppression or display of containers of files for all displayed nodes; and,
    subsequent to loading containers for display in the object browser responsive to the selection of the node, removing all containers loaded for display in the object browser.

6. A computer program product comprising a non-transitory computer usable storage medium having computer usable program code for flattening an object hierarchy in an object browser, the computer program product including:

computer usable program code for displaying the object browser in a memory of a computer;

computer usable program code for providing a singular option configured for toggling between (1) a suppression and (2) display of containers of files for all displayed modes;

computer usable program code for selecting a node in the object hierarchy in the object browser; and, computer usable program code for, responsive to selecting the node, displaying content for the selected node and content for at least one node below the selected node in the object browser, wherein displaying the content for the selected node and the content for at least one node below the selected node in the object browser, comprises:

computer usable program code for determining if the singular option configured for toggling between the suppression or display of the containers of files has been toggled to suppress a display of containers of files;

computer usable program code for displaying only files for the selected node and only files for at least one node below the selected node in the object browser, whilst suppressing from view containers for the selected node and containers for the at least one node below the selected node if it is determined that the singular option has been toggled for suppression selected; and, computer usable program code for otherwise displaying both files and files and containers for at least one node below the selected node in the object browser.

* * * * *